(12) United States Patent
Lennen

(10) Patent No.: US 9,291,717 B2
(45) Date of Patent: Mar. 22, 2016

(54) METHOD AND APPARATUS FOR EFFICIENTLY COMBINING SATELLITE NAVIGATION SIGNALS

(71) Applicant: Samsung Electronics Co., Ltd., Suwon-si, Gyeonggi-do (KR)

(72) Inventor: Gary Lennen, Cupertino, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 659 days.

(21) Appl. No.: 13/891,008

(22) Filed: May 9, 2013

(65) Prior Publication Data

US 2014/0354472 A1 Dec. 4, 2014

(51) Int. Cl.
*G01S 19/13* (2010.01)
*G01S 19/42* (2010.01)
*G01S 19/30* (2010.01)

(52) U.S. Cl.
CPC .............. *G01S 19/426* (2013.01); *G01S 19/30* (2013.01)

(58) Field of Classification Search
CPC ........... G01S 19/13; G01S 19/37; G01S 3/02; G01S 19/30; G01S 19/426
USPC ................... 342/357.71, 357.77, 458
See application file for complete search history.

(56) References Cited

U.S. PATENT DOCUMENTS

| | | | |
|---|---|---|---|
| 6,922,167 B2 | 7/2005 | Gerein | |
| 7,362,795 B1 | 4/2008 | Lennen | |
| 7,643,537 B1 * | 1/2010 | Giallorenzi | H04B 1/7093 375/142 |
| 7,994,977 B2 | 8/2011 | Lennen | |
| 8,027,371 B2 | 9/2011 | Fisher-Jeffes et al. | |
| 8,111,735 B2 | 2/2012 | Chen | |
| 2006/0022869 A1 * | 2/2006 | Zimmerman | G01S 11/02 342/458 |
| 2007/0205940 A1 | 9/2007 | Yang et al. | |
| 2009/0196329 A1 * | 8/2009 | Legate | G01S 19/02 375/141 |
| 2009/0224973 A1 * | 9/2009 | Nayyar | G01S 19/29 342/357.42 |
| 2011/0206031 A1 * | 8/2011 | Yoshimoto | H04B 1/59 370/345 |
| 2011/0261805 A1 | 10/2011 | Landry et al. | |
| 2011/0309978 A1 * | 12/2011 | Matsumoto | G01S 19/30 342/357.77 |

FOREIGN PATENT DOCUMENTS

CN 102207550 A 10/2011

OTHER PUBLICATIONS

Julian, Oliver; 2007, ION, Proceedings of the 2007 National Technical Meeting of the Institute of Navigation, pp. 227-239.*

* cited by examiner

*Primary Examiner* — Harry Liu
(74) *Attorney, Agent, or Firm* — Renaissance IP Law Group LLP

(57) ABSTRACT

A satellite signal navigation receiver can reduce channel resource usage and matched filter requirements by producing a single-bit local replica code from the combined incoming signals of each in view satellite. In one embodiment, the E1-B and E1-C signals from a Galileo satellite are received and converted into single-bit digital representations (B and C, respectively). A modified local replica code D is created by modifying (B−C) by replacing all "−2" values with "−1" values, by replacing all "+2" values with "+1" values, and by replacing all zero values such that a sum of the replaced zero values over a predetermined period will approximately equal zero. For instance, the "0" values can be replaced with alternating "−1" and "+1" values. Another modified replica code D* can be created by modifying (B+C) in a similar manner.

16 Claims, 7 Drawing Sheets

Figure 7

| | CNO (high) dB-Hz |
|---|---|
| B correlation | 42.46 |
| C correlation | 42.44 |
| (B – C) correlation | 45.40 |
| D correlation | 45.40 |

Simulation 10k trials, 1-sigma accuracy 0.1dB-Hz

METHOD AND APPARATUS FOR EFFICIENTLY COMBINING SATELLITE NAVIGATION SIGNALS

BACKGROUND

This disclosure relates generally to satellite navigation signal receivers, such as Global Navigation Satellite System (GNSS) receivers, and more particularly, to methods and apparatuses for efficiently combining satellite navigation signals.

The conventional Global Positioning System (GPS) traditionally transmitted only one signal (e.g., GPS L1 C/A code) to consumer users. Modern satellite systems, like in the Galileo positioning system, however, may transmit more than one signal on the same frequency for various purposes (including, for instance, providing secure signals not intended for use by most users, and providing multiple signals split between data and pilot channels). In the case of the Galileo system, two signals (Galileo E1-B and E1-C signals) are provided on the same frequency with 50% of the power being transmitted in each of the signals.

Conventional systems may combine signals from a single satellite to boost signal strength and optimize receiver acquisition, tracking sensitivity, and operation under dynamics. However, conventional systems lack the ability to combine signals in a way that permits the combined signal to be processed efficiently, for instance as a single-bit signal using a single channel per satellite.

SUMMARY

Satellite navigation systems with global or near global coverage can be referred to as Global Navigation Satellite Systems (GNSS). These include, for instance, the United States' NAVSTAR Global Positioning System (GPS), Russia's Global Navigation Satellite System (GLONASS), China's Compass navigation system (Compass), and the European Union's Galileo positioning system (Galileo).

In the case of Galileo satellite signals, a GNSS receiver typically frequency translates every in-view satellite's E1-B and E1-C signals to a lower carrier frequency before sampling the signal bands via an analog to digital converter (ADC). Thereafter, the signals are processed digitally in a digital signal processor. Because Galileo and GPS receive bands are sufficiently close, the digitized signals may contain both system's visible satellites.

Digital signal processing in a conventional receiver is used to acquire, track, and demodulate the individual satellite signals, plus many other functions known to those skilled in the art. The output of the digital signal processor is typically a range measurement for each satellite in-view, which can then be further processed to produce a navigation, velocity, and timing solution also known to those skilled in the art.

In a conventional digital signal processor, the digitized samples are sent to a digital pre-processor block that may perform interference mitigation, filtering, re-sampling, or other operations. These operations can include, for instance, generating an automatic gain control (AGC) signal designed to keep the N-bit sampled signal+noise within an optimal range.

If the receiver is capable of processing 20 channels, then it can use up to 20 channels to perform satellite acquisition and tracking tasks. Although 20 channels may have conventionally been sufficient for GPS position tracking and navigation, with the evolution of additional satellite systems (e.g., Glonass, Galileo, Compass, etc.), the number of satellites in-view, as well as user performance expectations, have grown substantially. Accordingly, it is now not unreasonable to expect a satellite navigation receiver to have upwards of 200 channels.

A matched filtering operation correlates the incoming satellite signal with a locally generated spreading code replica, the mathematical definition is given as follows:

$$z(t) = \int x(t)^* y(t+\tau) d\tau$$

($\tau$ typically covers $-1$ msec to $+1$ msec)

Where $x(t)$ is the incoming satellite signal and $y(t)$ is the locally generated replica. The variable $t$ is the time shift applied to $y(t)$ to generate outputs at different relative code delays. The output $z(t)$ is the desired correlation output. Each satellite transmits a different spreading code and, in the case of Galileo satellite systems, two spreading codes per satellite (i.e., one for each of the E1-B and E1-C signals).

The E1-B and E1-C signals are typically transmitted with equal power. Therefore, if only one of the signals is received, half of the available signal power (e.g., approximately 3 dB of signal power) will be wasted. For satellite reception in the most challenging environments, it is therefore preferable to receive both E1-B and E1-C signals and then combine them to maximize the received signal power. This signal combining enables the highest sensitivity and best dynamic performance satellite acquisition and tracking.

The E1-B and E1-C signals are each defined as binary sequences. Therefore when receiving the E1-B or E1-C signals, the locally generated replica can be efficiently represented as a $K=1$-bit signal. And because the locally generated replica for these signals is a one bit signal, this allows the matched filter for the E1-B and E1-C signals to be optimally designed having minimal Application Specific Integrated Circuit (ASIC) area and power consumption characteristics.

Combining the E1-B and E1-C signals can be achieved, for instance, by correlating the incoming satellite signal with a locally generated replica of (E1-B)-(E1-C). Generating a replica like this from two binary sequences, however, generates a three-state sequence (e.g., binary states={$-1$, $+1$}, combination states={$-2$, $0$, $+2$}). Unfortunately, for optimal matched filter design, this 3-state local code presents a problem because it cannot be represented by a single bit. Typically, this problem has been solved by having the matched filter correlate first with E1-B, then independently with E1-C, and subsequently combining the output results to create the correlation of E1-B and E1-C. This operation, however, requires two channels per satellite, which is also undesirable because it uses up more of the receiver's important channel resources.

Smart phones and other GNSS devices are trending toward receiving the Galileo E1-B and E1-C signals. These two signals are transmitted together at a carrier frequency of 1575.42 MHz. Each satellite has different spreading codes for its E1-B and E1-C transmission, and 50 such pairs of codes have been defined in the Interface Control Document (ICD) (see "European GNSS (Galileo) Signals in Space Interface Control Document," issue 1, February 2010, the contents of which are hereby incorporated herein by reference in their entirety).

According to principles of the present inventive concepts, a receiver can be designed to permit the combined E1-B and E1-C correlation to be performed with a single matched filter operation while maintaining a 1-bit local replica code generation. This thereby enables a matched filter design with minimum ASIC space and power requirements while sparing additional demands on the limited channel resources.

In one embodiment, the incoming signal is correlated with a modified locally generated code, instead of the ICD defined E1-B or E1-C memory codes. These locally generated codes can be designated, for instance, as D and D*, with a D and D* code generated for each satellite. In one embodiment, D represents a modified version of B−C (where B and C are the digital representations of the E1-B and E1-C signals, respectively). Correspondingly, D* represents a modified version of B+C. The determination of which locally generated code (D or D*) to correlate with any given time can be determined by the data bit sign relationship between the B and C codes at that time.

Various methods can be used for creating the modified local replica codes. For example, the D code can be formed from (B−C) by replacing the resulting 3-state values {−2, 0, +2} as follows: setting "−2"=>"4", "+2"=>"+1", and replacing all "0" values in the memory code by alternating "−1" and "+1" values such that over the code correlation period (e.g., 4 msecs) they will approximately correlate to zero. It should be noted, however, that other mechanisms for ensuring that the replaced zero values accumulate to approximately zero over the desired period are also possible. For example, the first two, three, four, or more "0" values could be replaced by a value of "−1" with the next like number of "0" values replaced by "+1", and repeating the replacement sequence for the duration of the period. The D* code can be formed from (B+C) in a similar manner.

D and D* are therefore modified versions of (B−C) and (B+C), respectively, with a single bit signal space of {4, +1}, rather than a three-state sequence of {−2, 0, +2}. Accordingly, because the substituted D and D* signals are single bit representations, by using D and D*, the matched filter structures can remain unchanged. The ASIC area and power consumption attributes can therefore benefit significantly from this design, and the channel resources can be spared from additional burdens.

BRIEF DESCRIPTION OF THE DRAWINGS

FIG. 7 is a chart schematically illustrating the negligible change to the carrier to noise density ratio (CNO) when replacing the conventional (B−C) code with D as the local replica code in a receiver system and method using principles of the present inventive concepts.

DETAILED DESCRIPTION

The following detailed description is presented to enable one of ordinary skill in the art to make and use the invention, and is provided in the context of a patent application and its requirements. Accordingly, various modifications to the exemplary embodiments and the generic principles and features described herein will be readily apparent to those skilled in the art. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments as well as to multiple embodiments. The embodiments will be described with respect to systems and/or devices having certain components. However, systems and/or devices according to the present inventive principles may include more or fewer components than those shown, and variations in the arrangement and type of the components may be made without departing from the scope of the inventive concepts. The exemplary embodiments may also be described in the context of particular methods having certain steps. However, the method and system operate effectively for other methods having different and/or additional steps and steps in different orders that are not inconsistent with the exemplary embodiments. Thus, the present inventive concepts are not intended to be limited to the embodiments shown, but are to be accorded the widest scope consistent with the principles and features described herein.

Figure 1:
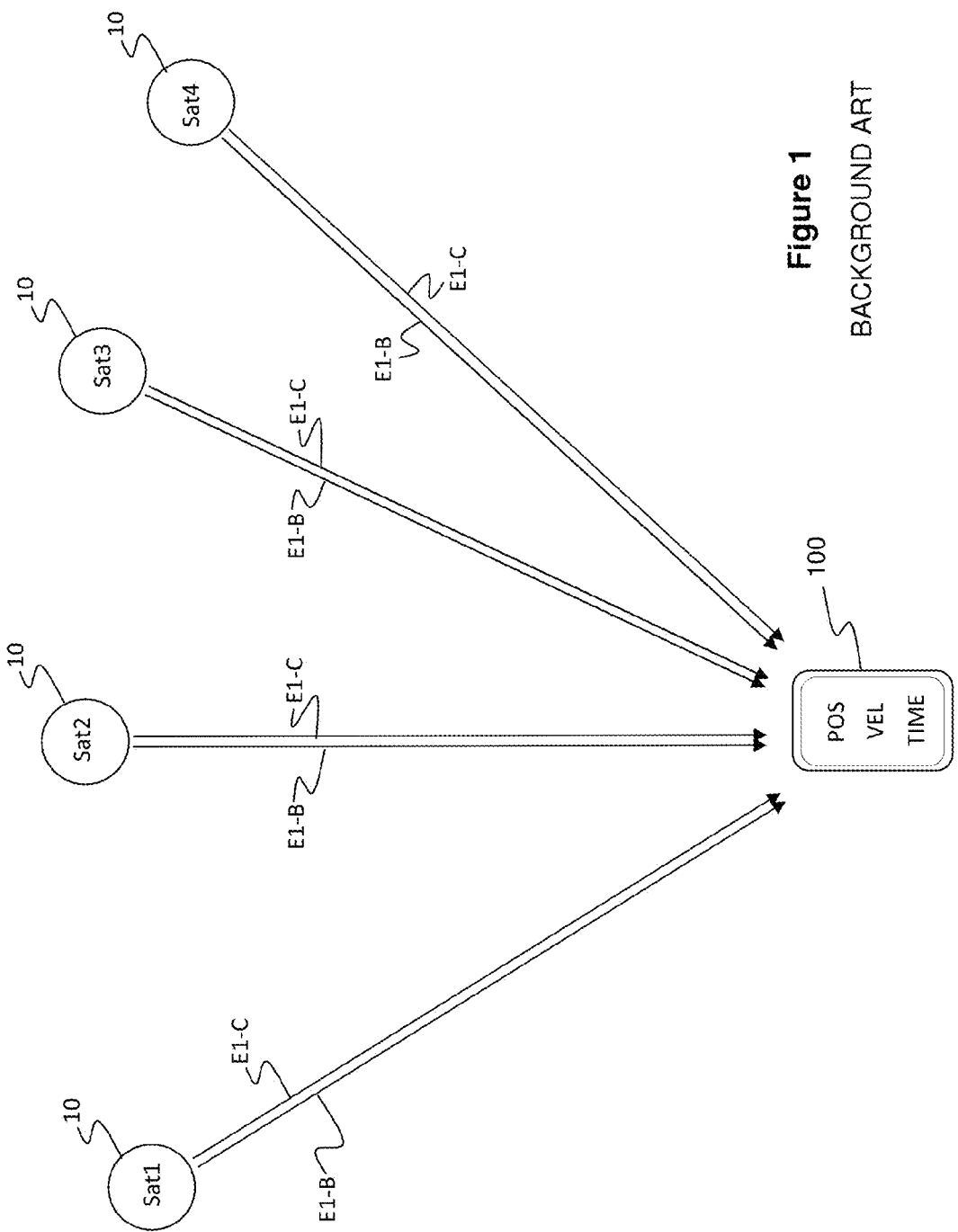
FIG. 1 is a schematic diagram illustrating a GNSS receiver receiving satellite tracking signals, according to the conventional art.
Figure 2:
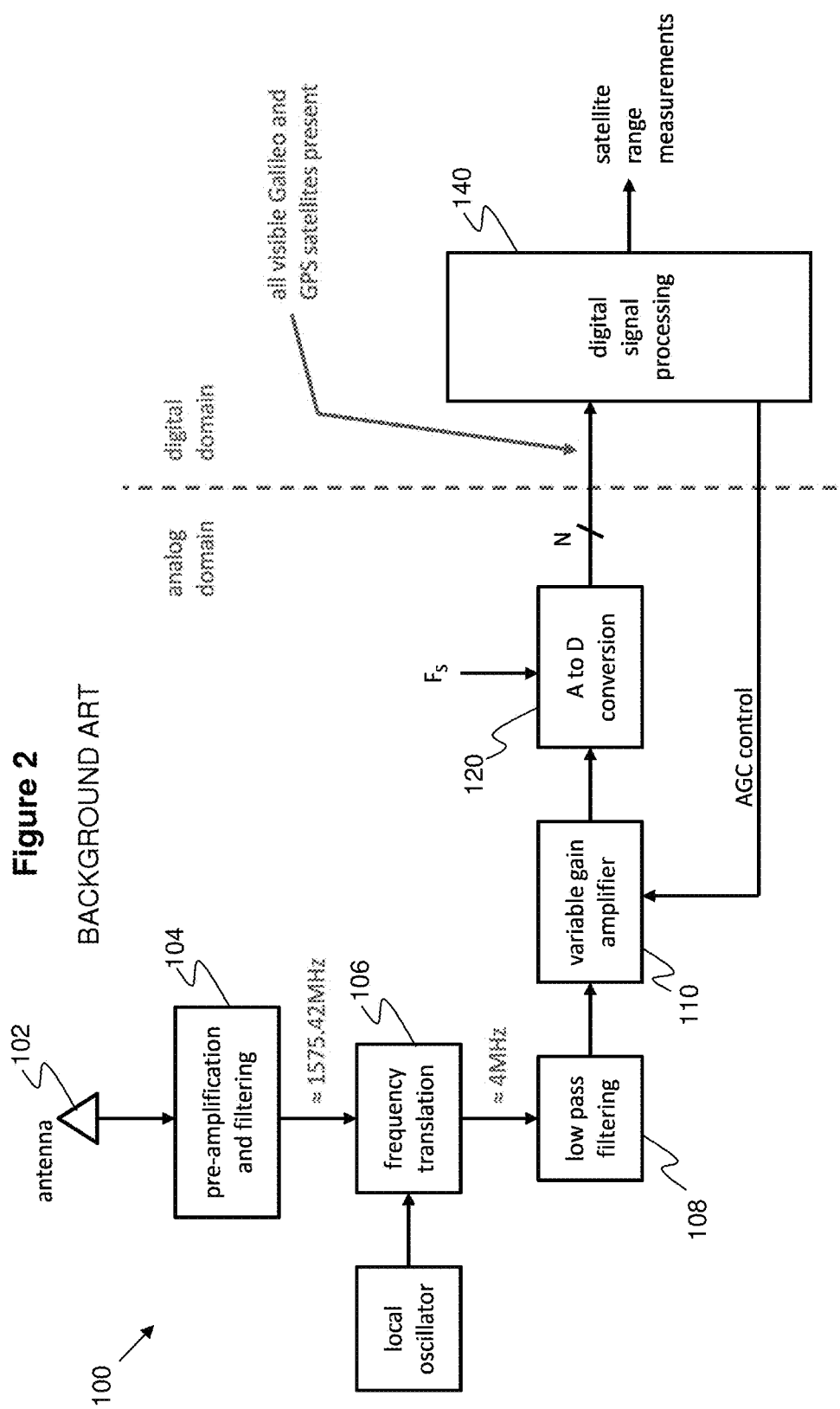
FIG. 2 is a schematic block diagram illustrating a conventional system and method for processing satellite signals in a GNSS receiver.
Figure 3:
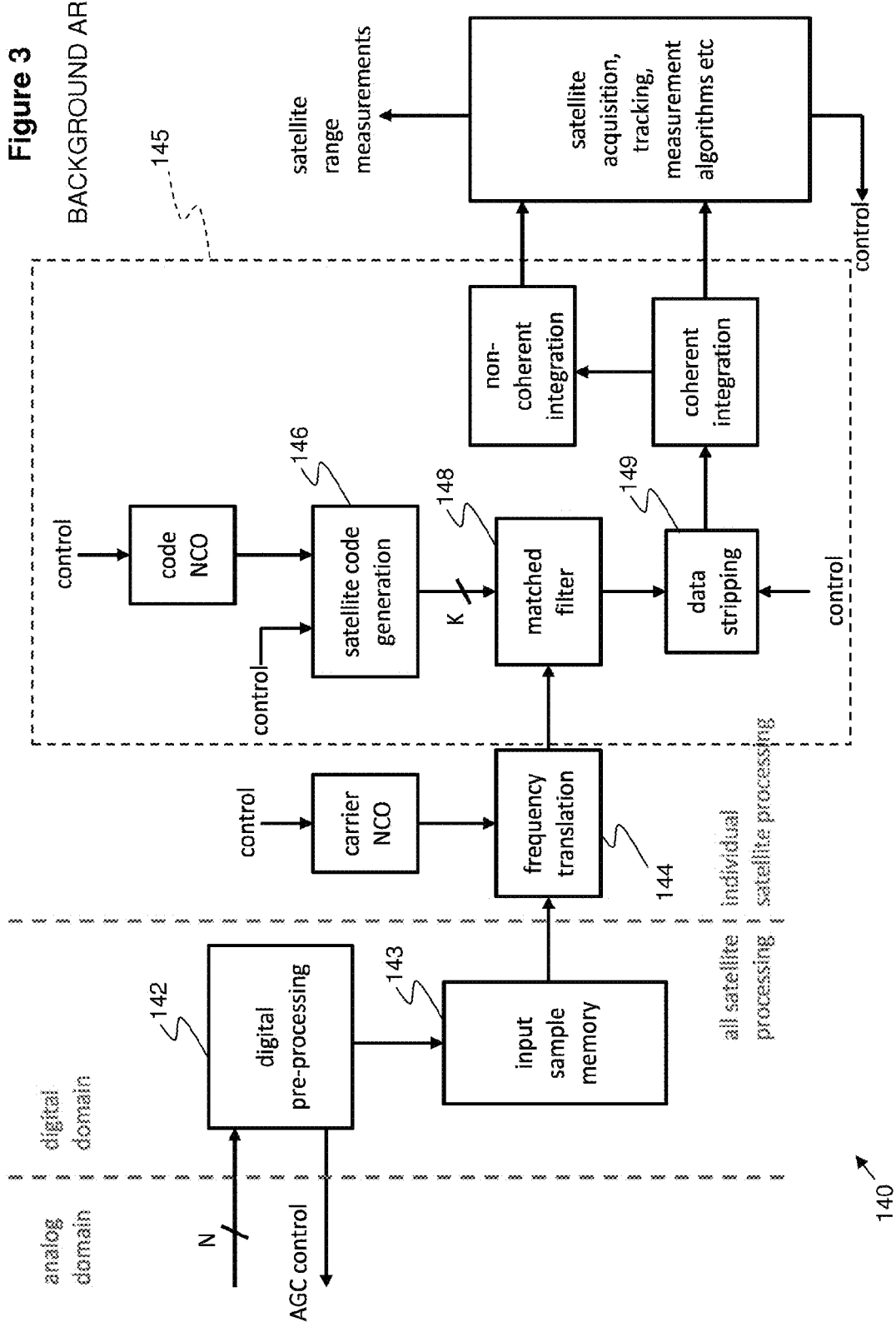
FIG. 3 is a schematic block diagram further illustrating the digital signal processor structure and operation of the conventional system and method of FIG. 2.

FIG. 1 illustrates a satellite receiver 100 receiving navigation signals (E1-B, E1-C) from a number of in view satellites 10 (e.g., four satellites in this example). FIGS. 2 and 3 illustrate a conventional method of processing satellite signals in a GNSS receiver 100. Referring to FIGS. 1, 2, and 3, a receiver 100 typically frequency translates every in-view satellite's E1-B and E1-C signals to a lower carrier frequency before sampling the signal bands via an ADC 120. Following A to D conversion, the signals thereafter are processed digitally.

FIG. 2 is a schematic block diagram illustrating this frequency translation and digitization system and process. It should be noted that the system can be used for multiple satellite systems.

For instance, the Galileo and GPS receive bands are close enough such that the digitized signals from the ADC 120 can contain both System's visible satellites.

Referring to FIG. 2, an antenna 102 receives the satellite signals into the receiver 100. The incoming signals are run through a pre-amplification and filtering process 104 which outputs the approximately 1575.42 MHz carrier frequency E1-B and E1-C signals. The signals are then frequency translated in the frequency translator 106 to a lower carrier frequency (e.g., about 4 MHz). The signals are then passed through a low pass filter 108 and a variable gain amplifier 110 before sampling the signal bands via an analog to digital converter (ADC) 120. An AGC control signal from the digital signal processor 140 can be used in conjunction with the variable gain amplifier 110 to keep the N-bit sampled signal+ noise ratio within an optimal range.

After digitization in the ADC 120, the signals are sent to a digital signal processor 140, which is shown in more detail in FIG. 3. The purpose of the digital signal processor 140 is to acquire, track, and demodulate the individual satellite signals, plus many other functions known in the art. The output of the digital signal processor 140 is typically a range measurement for each satellite 10 in-view. Each of these range measurements can then be further processed to produce a navigation, velocity, and timing solution as also known in the art.

As will be described in further detail with additional reference to FIGS. 4 and 5, the principles of the present inventive concepts can be understood more completely with respect to what happens within the digital signal processing block 140.

FIG. 3 illustrates the operation of a conventional digital signal processor 140. Referring first specifically to FIG. 3, the digitized samples from the ADC circuitry 120 are sent to a digital pre-processor block 142 that may, for instance, perform interference mitigation, filtering, re-sampling or other operations (including generating an AGC control signal designed to keep the N-bit sampled signal+noise ratio within an optimal range). The output of the digital pre-processor 142 contains samples of all of the signals from each of the in-view satellites 10 and is stored in an input sample memory 143. The input sample memory 143 can be subsequently read out at a much higher clock rate such that many satellite signals may be processed successively, essentially processing the signals faster than real-time.

This digital signal processor structure 140 typically determines the number of channels a receiver is capable of processing. For example, if the receiver is capable of processing 20 channels then it can use up to 20 channels to perform satellite acquisition and tracking tasks. Although, conventionally, 20 channels may have been sufficient for performing GPS satellite signal acquisition, tracking, and measurement functions, with the evolution of additional satellite systems (e.g., Glonass, Galileo, Compass, etc.), the number of satellites in-view and user performance expectations have grown substantially, where-in upwards of 200 channels is not an unreasonable expectation.

As shown in FIG. 3, signal processing for each of the individual satellites is performed on the signal samples stored in the input sample memory 143. The typical signal processing performed by a satellite navigation receiver on individual satellite signals includes digital frequency translation in a frequency translator 144, and matched filtering in a code generation and processing block 145. The matched filtering operation (performed in matched filter 148) correlates the incoming satellite signal with a locally generated spreading code replica, with the mathematical definition given as follows:

$$z(t)=\int x(t)^* y(t+\tau)d\tau$$

(τ typically covers −1 msec to +1 msec)

In this equation, x(t) is the incoming satellite signal and y(t) is the locally generated replica. The variable τ is the time shift applied to y(t) to generate outputs at different relative code delays. The output z(t) is the desired correlation output. Each satellite transmits a different spreading code and, in the case of Galileo satellites, two spreading codes per satellite (one for each of the E1-B and E1-C signals).

As noted previously, the E1-B and E1-C signals are each transmitted with equal power such that if only one signal is received and utilized, then half of the available signal power will be wasted. For satellite reception in the most challenging environments, it is therefore desirable to receive both E1-B and E1-C signals and then combine them to maximize received signal power, thus enabling the highest sensitivity and best dynamic performance satellite acquisition and tracking.

E1-B and E1-C are defined as binary sequences. Therefore, when receiving E1-B or E1-C, the locally generated replica can be efficiently represented as a K=1-bit signal. And because it is a 1-bit signal, this allows the matched filter to be designed to minimize ASIC area and power consumption. Even when processing only a single-bit signal, the matched filter 148 can be a significant component in terms of its space and power requirements. It is therefore desirable to minimize the complexity of the matched filter 148 to reduce its demand on system space and power.

Combining the E1-B and E1-C signals is conventionally achieved by correlating the incoming satellite signal with a locally generated replica of the combined signals ((E1-B)−(E1-C)), generated in the satellite code generation circuitry 146. Unfortunately, however, generating the local replica from two binary sequences results in a three-state sequence (binary={−1,±1}, combination={−2,0,+2}). Because this 3-state local code must be represented by multiple bits, it presents a problem for an optimized matched filter design. This problem is typically solved by having the matched filter 148 correlate first with E1-B, then independently with E1-C, and subsequently combining the output results to create the correlation of E1-B and E1-C. Unfortunately, however, this operation requires two channels per satellite, which is also undesirable as it quickly uses up important channel resources of the receiver. Accordingly, it would be desirable to enable a combined signal from a single satellite that can be represented by a single-bit local replica code without significant degradation in its other performance characteristics.

The principles of the present inventive concepts are designed to allow combined E1-B and E1-C correlation to be performed with a single matched filter operation while maintaining a 1-bit local code generation. They further permit the correlation of the combined signals to be performed using only a single channel per satellite.

According to principles of the present inventive concepts, smart phones and other GNSS receivers may receive both the Galileo E1-B and E1-C signals. As explained previously, these two signals are transmitted together at a carrier frequency of 1575.42 MHz, and each satellite has different spreading codes for its E1-B and E1-C transmissions. Fifty such pairs of codes have been defined in the ICD (see "European GNSS (Galileo) Signals in Space Interface Control Document", issue 1, February 2010).

Figure 4:
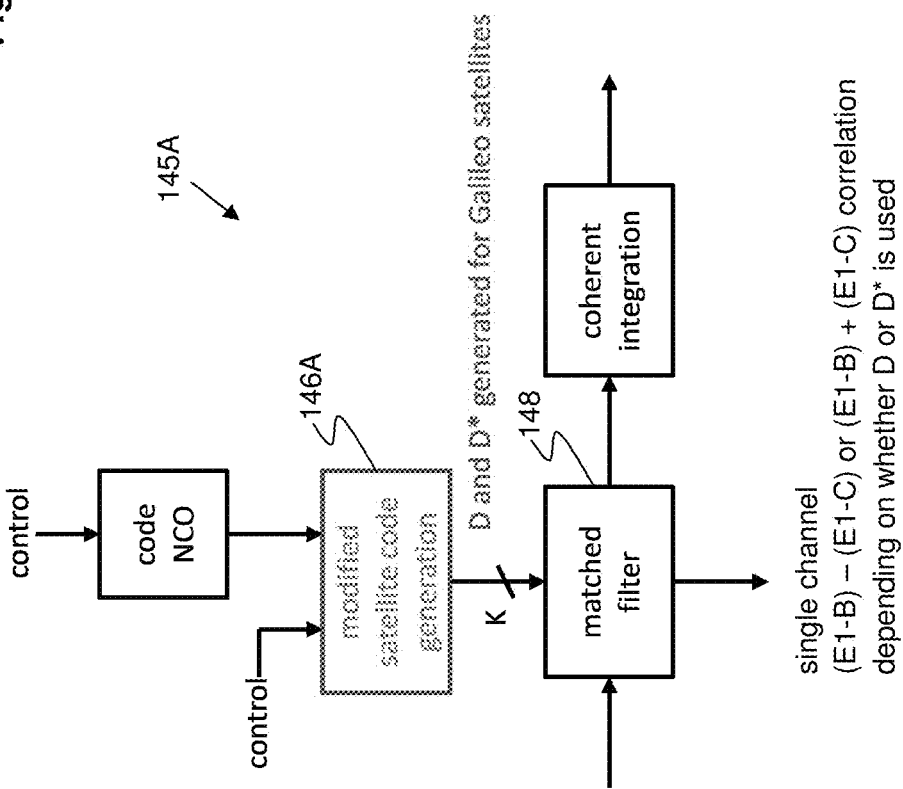
FIG. 4 is a schematic block diagram illustrating a system and method for processing satellite signals in a receiver constructed according to principles of the present inventive concepts.

FIG. 4 is a schematic block diagram of a modified satellite code generation and processing block 145A, illustrating one embodiment of how the inventive concepts may be integrated into the receiver 100. Referring to FIG. 4, a modified signal code generation and processing block 145A can be substituted for the code generation and processing block 145 of FIG. 3. As can be seen from a comparison of FIGS. 3 and 4, the modified block 145A replaces the conventional satellite code generation block 146 with a modified code generation block 146A.

Using the modified satellite code generation and processing block 145A, the incoming signal can be correlated with a modified locally generated code (e.g., D and D*), instead of the ICD defined E1-B or E1-C memory codes. According to this embodiment, new locally generated codes are designated D and D*, with a D and D* code generated for each satellite. D represents a modified version of (B−C) and D* represents a modified version of (B+C). Which code to correlate with is determined by the data bit sign relationship between B and C codes at any given time.

More specifically, D and D* are preferably modified versions of (B−C) and (B+C), respectively, each having a signal space of {−1, +1} instead of {−2, 0, +2}. With D and D* having a single-bit signal space, the matched filter structures can be optimized with reduced area and power requirements.

It should be noted that the results of (B−C) and (B+C) typically contain approximately 50% "0" values, 25% "−2" values and 25% "+2" values. Therefore, according to principles of the present inventive concepts, to achieve a signal space of {−1, +1}, the locally generated D and D* codes can be formed from (B−C) or (B+C), respectively, as follows:

All "−2" values are set equal to a value of "−1",
All "+2" values are set equal to a value of "+1", and The "0" values are replaced with alternating "−1" and "+1" values such that over the code correlation period (e.g., 4 msecs), the sum of these values will approximately correlate to zero.

Of course, it will be readily understood that other mechanisms for ensuring that the overall value of the zeros in the single bit (B−C) and (B+C) representations over a predetermined period accumulate to approximately zero are also possible. For example, the first two, three, four, or more "0" values could be replaced by a value of "−1" with the next like number of "0" values replaced by "+1", with the replacement sequence repeated for the duration of the period.

In summary, the D and D* locally generated codes can therefore be created and used as follows:

Step 1—Create two new locally generated single-bit memory codes from the E1-B and E1-C signals, with D z (B−C) and D*≈(B+C) over a predetermined signal period.

Step 2—Correlate the incoming signal with D or D*, as determined based on the data bit sign relationship between the B and C codes at the given time.

Using the modified correlation codes according to the present inventive principles, a single bit matched filter can be used for the correlation operation and significant space, power, and/or channel resources can be preserved. In addition, according to these principles data stripping can be built into the selection of correlation between D and D* so the data stripping block 149 of FIG. 3 need not be required.

Figure 5:
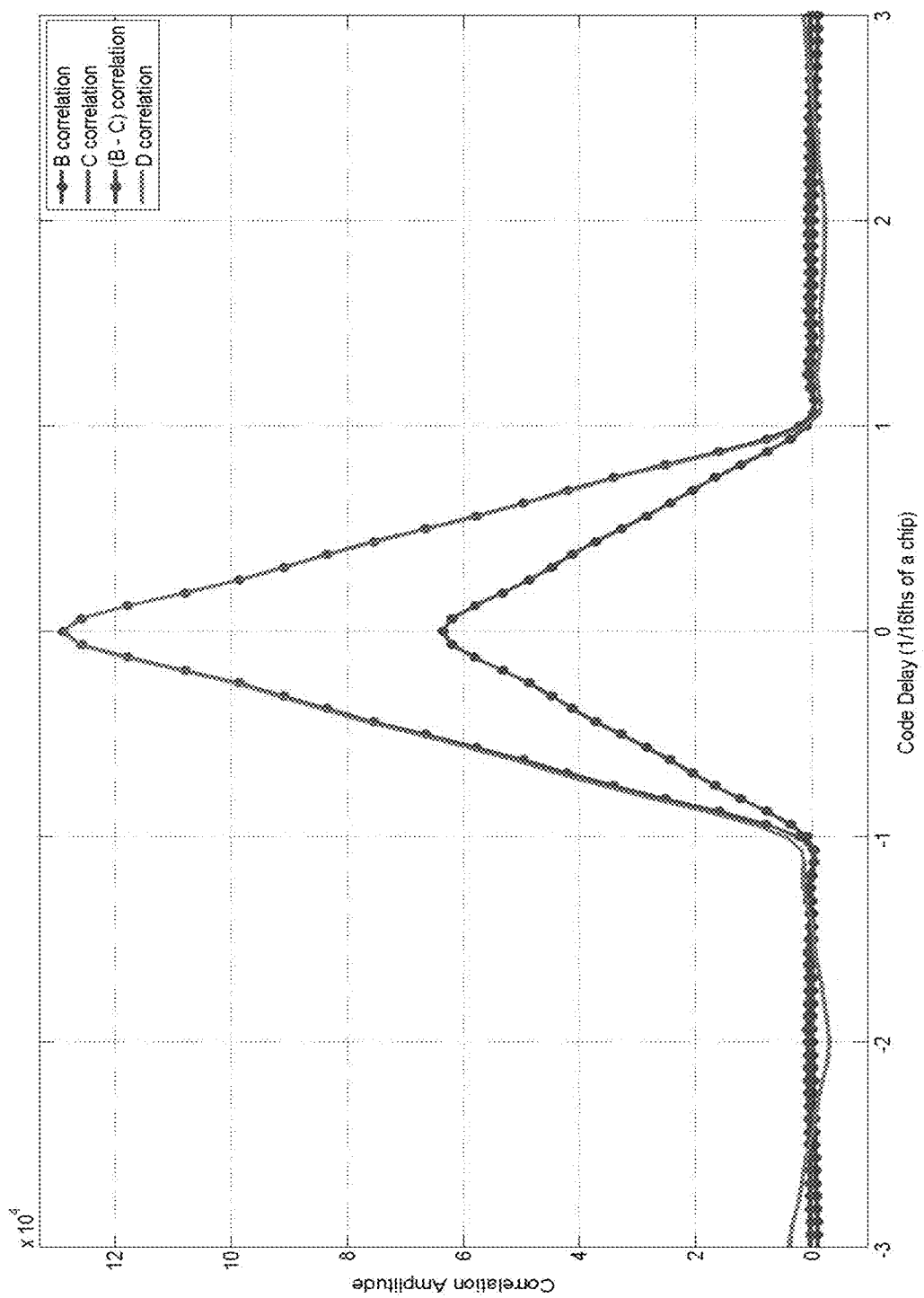
FIGS. 5 and 6 are graphs illustrating similarities in correlations between conventional B and C signals and modified local codes created using principles of the present inventive concepts.
Figure 6:
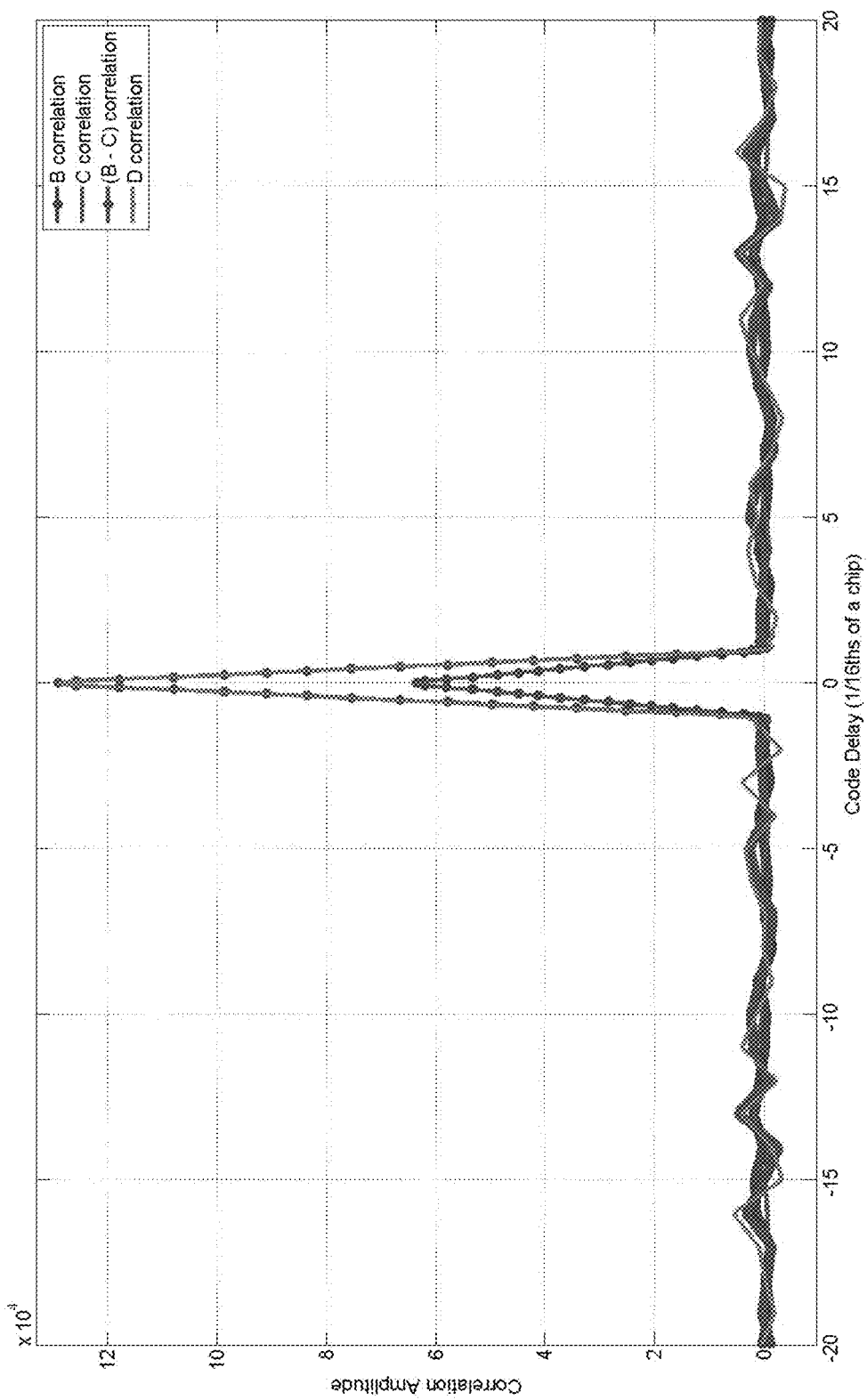

FIGS. 5, 6 and 7 further illustrate the operation and benefits of the present inventive concepts. In particular, FIGS. 5 and 6 are graphs which illustrate how the correlation result remains unchanged whether using D or (B−C) as the local replica code. FIG. 7 is a chart illustrating that there is negligible change to the carrier to noise density ratio (CNO) when replacing (B−C) with D as the local replica code in a receiver system and method using principles of the present inventive concepts.

Referring first to FIGS. 5 and 6, these graphs show the relationship between correlation amplitude and code delay for each of the B correlation, C correlation, (B−C) correlation, and D correlation. The only difference between FIGS. 5 and 6 is the scale used for the code delay. As can be seen from FIGS. 5 and 6, the D correlation according to principles of the present inventive concepts corresponds closely with the (B−C) correlation and provides the same signal amplification benefits. Referring additionally to FIG. 7, the D correlation and (B−C) correlations are further equivalent in terms of their carrier to noise density ratios.

Accordingly, principles of the present inventive concepts permit a single-bit locally generated code to be used for correlation with an incoming satellite navigation signal to allow an optimized matched filter design with minimal space and power requirements. These principles may also be used to limit demands on channel resources.

Although the principles of the present inventive concepts have been described herein with respect to certain embodiments thereof, the inventive concepts are not limited thereto. The principles of the present inventive concepts, for instance, are not limited to use with the Galileo E1-B and E1-C signals. Other examples of signals transmitted on the same frequency from the same satellite include modern/future GPS L1-C signals combined with the legacy GPS L1 C/A code, both of which may use binary spreading codes and transmit on a frequency of 1575.42 MHz. In addition, transmitting the GPS L1 C/A signal along with an SBAS C/A code from the same satellite is possible, as is the case in the Japanese augmentation satellite system (QZSS). The signal combining principles of the present inventive concepts are equally applicable to these and other signal systems.

The scope of these inventive principles should therefore not be limited to any specific embodiment but should be interpreted to cover all such configurations and modifications thereto encompassed by the spirit and scope of the appended claims.

What is claimed is:

1. A satellite navigation signal receiver, comprising:
a digital signal processor configured to process a pair of incoming satellite signals from each of a plurality of in-view satellites;
a modified code generation unit configured to generate a single single-bit modified local replica code for each of the plurality of in-view satellites, the single single-bit modified local replica code for each in-view satellite being based on adding or subtracting a single-bit digital representation of one of the pair of incoming satellite signals for the in-view satellite from a single-bit digital representation of the other of the pair of incoming satellite signals for the in-view satellite; and
a matched filter configured to correlate an incoming satellite signal with the modified local replica codes.

2. A satellite navigation signal receiver according to claim 1, wherein the modified local replica code is created by adding the single-bit digital representations and then replacing each value of "−2" with a value of "−1", replacing each value of "+2" with a value of "+1", and replacing each zero value with a value of either "−1" or "+1" such that a sum of all the replaced zero values over a predetermined period will approximately equal zero.

3. A satellite navigation signal receiver according to claim 1, wherein the modified local replica code is created by subtracting one of the single-bit digital representations from another one of the single-bit representations and by then replacing each value of "−2" with a value of "−1", replacing each value of "+2" with a value of "+1", and replacing the zero values with values of "−1" and "+1" such that a sum of all the replaced zero values over a predetermined period will equal approximately zero.

4. A satellite navigation signal receiver according to claim 2, wherein the zero values are replaced with alternating "−1" and "+1" values.

5. A satellite navigation signal receiver according to claim 3, wherein the zero values are replaced with alternating "−1" and "+1" values.

6. A satellite navigation signal receiver according to claim 2, wherein a predetermined number of zero values are alternately replaced with "−1" and "+1" values.

7. A satellite navigation signal receiver according to claim 3, wherein a predetermined number of zero values are alternately replaced with "−1" and "+1" values.

8. A satellite navigation signal receiver according to claim 1, further comprising two hundred or more channels configured to process signals from up to two hundred or more individual in-view satellites.

9. A method of combining satellite navigation signals in a signal receiver, the signal receiver comprising a signal receiving unit, an analog-to-digital converter and a code generator, said method comprising:
receiving at the signal receiving unit two or more signals from a single satellite;
converting at the analog-to-digital converter each of the two or more signals into digital representations of the satellite signals;

combining at the code generator by adding or subtracting the two or more digital representations of the satellite signals to create a combined signal representation;

modifying at the code generator the combined signal representation to create a single single-bit local replica code; and correlating the single-bit local replica code with a received signal from the single satellite.

10. A method according to claim 9, wherein modifying the combined signal representation comprises replacing all "−2" values with "−1" values, replacing all "+2" values with "+1" values, and replacing "0" values with "−1" and "+1" values such that over a predetermined period the sum of the replaced "0" values will approximately equal zero.

11. A method according to claim 10, wherein the "0" values are replaced with alternating "−1" and "+1" values.

12. A satellite navigation signal receiver, comprising:
a signal receiving unit configured to receive a pair of incoming signals from an in-view satellite;
an analog to digital conversion circuit configured to convert each of the received incoming signals into a single-bit signal code; and
a digital signal processor configured to process the single-bit signal codes to obtain navigation information, said digital signal processor comprising:
a modified code generator configured to generate a single single-bit local replica code based on adding or subtracting one of the single-bit codes from the other single-bit signal codes; and
a matched filter configured to correlate the local replica code with the incoming signals.

13. A satellite navigation signal receiver according to claim 12, wherein the plurality of incoming signals comprises a pair of incoming signals.

14. A satellite navigation signal receiver according to claim 13, wherein the single single-bit local replica code is further generated replacing all "−2" values with "−1" values, replacing all "+2" values with "+1" values, and replacing the "0" values with "−1" and "+1" values such that a sum of the replaced "0" values will approximately equal zero over a predetermined period.

15. A satellite navigation signal receiver according to claim 14, wherein the "0" values are replaced with alternating "−1" and "+1" values.

16. A satellite navigation signal receiver according to claim 14, wherein a predetermined number of "0" values are replaced with "−1" values and a predetermined number of "0" values are replaced with "+1" values in an alternating sequence.

* * * * *